Aug. 20, 1957  E. M. EVANS ET AL  2,803,810
DISTRESS SIGNALING DEVICE
Filed Feb. 3, 1956  2 Sheets-Sheet 1
INVENTORS.
EUGENE M. EVANS
HOMER A. GRANT
BY *Hamilton + Hamilton*
Attorneys.

Aug. 20, 1957  E. M. EVANS ET AL  2,803,810
DISTRESS SIGNALING DEVICE
Filed Feb. 3, 1956  2 Sheets-Sheet 2
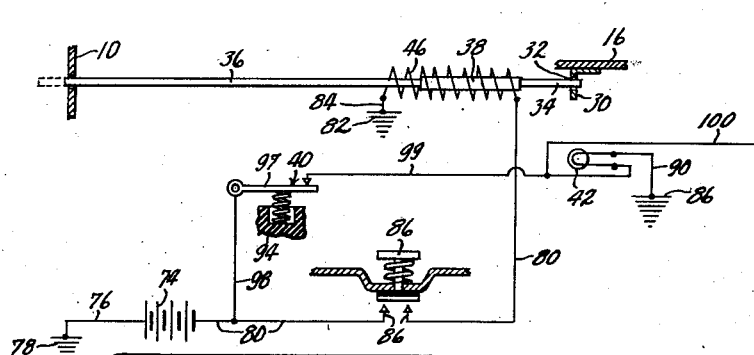
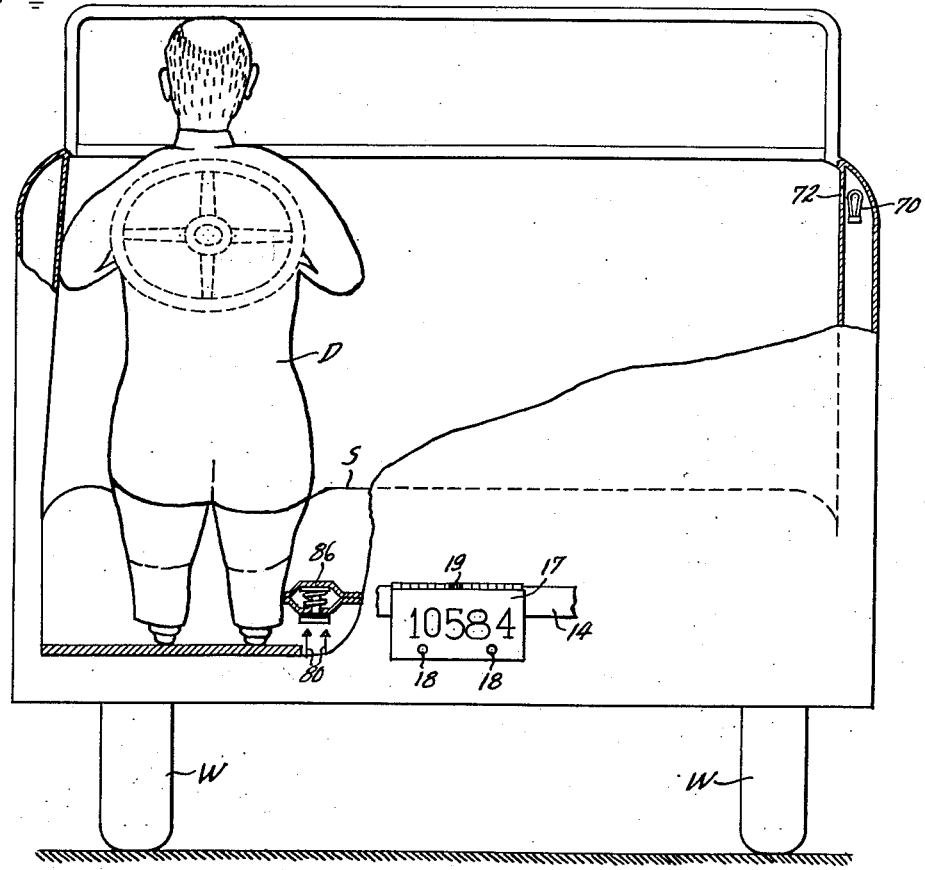
INVENTORS.
EUGENE M. EVANS
HOMER A. GRANT
BY
Hamilton & Hamilton
Attorneys.

United States Patent Office 2,803,810
Patented Aug. 20, 1957

2,803,810

DISTRESS SIGNALING DEVICE

Eugene M. Evans, Kansas City, and Homer A. Grant, Independence, Mo.

Application February 3, 1956, Serial No. 563,293

4 Claims. (Cl. 340—63)

This invention relates to a device for signaling for aid when in danger, trouble or sickness when confined in an automobile, office or home. To show one of the most common uses of this device, it will be shown as used on an automobile where there is an attempted robbery of the automobile driver by an intruder with a threatening weapon.

The principal object of this invention is the provision of a moving signaling device operable by the automobile operator by closing an electric switch to release a door lid latch whereby said lid will be moved to attract the attention of persons at the rear of the automobile.

An operating spring by which the lid is caused to open and move is so mounted that in conjunction with a leaf spring the lid will be held out of balance so that it will oscillate as the automobile is driven over the road. This will attract attention to the distress signals located on the inside of said lid and the box associated therewith.

The license plate for the automobile is bolted to the outside of said lid, and is in convenient reading position when the box is in the normal locked position. A solenoid for releasing the door lid by the closing of said switch is so constructed that it will release the latching means with a single operation.

Reference will now be had to the drawings wherein:

Fig. 1 is an elevational view of the open signalling alarm box as used in this distress signaling device.

Fig. 2 is a sectional view of signaling alarm box taken on line II—II of Fig. 1, Fig. 3 is an enlarged foreshortened view of the closed signal taken on line III—III of Fig. 1 with parts omitted, Fig. 4 is a view similar to Fig. 3 taken on line IV—IV of Fig. 1 with parts omitted, Fig. 5 is a longitudinal sectional view of box 10 taken on line V—V and looking in the direction indicated by the arrows, Fig. 6 is a sectional view of the electric switch operable by the box lid and taken on line VI—VI of Fig. 1, Fig. 7 is a diagrammatic view of an automobile with the distress signaling device shown thereon and with parts broken away, and Fig. 8 is a diagrammatic view of the electric circuit used with said signaling device.

Reference will now be had to the drawings wherein like reference numerals refer to similar parts throughout the several views and the numeral 10 refers to an alarm box suitably mounted on an automobile frame by means of bolts 12 which are shown in engagement with the license plate carrier 14 which is always electrically connected with the automobile frame which is insulated from the earth by rubber wheels. This license plate carrier 14 may be mounted at any convenient position on the rear of the automobile. This box 10 has a lid 16 which is normally disposed in a vertical position to display an automobile license plate 17 carried on the outer face of said lid and secured thereto by means of bolts 18. When the box is closed and positioned as shown on the automobile, the license plate will be properly positioned to comply with the law.

The lid 16 is urged to the opened position by means of helical spring 19 mounted on hinge pintel 20 with its one end portion fixed to the box member 10 by means of the hook 22 formed in one end of spring 19 and the other end is positioned against the inside surface of lid 16 so that when the lid is unlatched it will be urged to upright vertical position by the action of spring 19. When this lid moves toward the vertical position it will contact the adjustable leaf spring 24 which will stop its opening movement and urge it to an out of balance position so that as the automobile is driven over the road it will cause the lid to oscillate through a limited arc due to the helical spring 19 and the leaf spring 24. The action of these two springs is such that spring 19 can move the lid up to contact spring 24 which in turn will move the lid to a slightly off balanced position whereby when the automobile is being driven it will impart a rocking motion to said lid.

It will be noted that leaf spring 24 is mounted on a standard 28 which is fixed to the upper end of box 10. This rocking of the lid will attract attention to the open box with the urgent call for help displayed thereon.

With these two springs properly tensioned this oscillatory movement of the lid may be produced at all times when the automobile is driven over the present day roads. The car operator may properly adjust the relative tension of the two springs by adjusting the set screw 26 for leaf spring 24.

By balancing said lid it will be apparent that the normal action of the moving automobile will cause a movement of the lid in such a position that it will not settle down to a fixed position except when the automobile is standing still. However there will always be a reasonable oscillatory movement of said lid whenever the lid is released and spring 19 quickly opens the lid, there will be sufficient movement to attract attention to the call for help even if the automobile is not in action.

The box 10 also contains a lid latching means, an electric switch and lighting means for the inside of said box whereby the call for help can be easily detected and transmitted to the proper authorities. The lid latching means includes an inwardly projecting tongue 30 extending from adjacent the free edge of said lid and has a hole 32 formed therethrough to receive latching pin 34. This latching pin is rigidly fixed to operating rod 36 which is disposed in axial alignment with the solenoid magnetic core 38 which serves to move the latching pin 34 out of engagement with tongue 30 to release the lid 16 to permit spring 19 to move it to the vertical position above box 10 as shown in Figs. 1 and 2 where it will oscillate to visually call attention to the need for help. At the same time switch 40 will be closed to energize light bulb 42 whereby the interior of box 10 and the inside of lid 16 will be illuminated, to disclose information shown thereon. The magnetic solenoid core 38 is provided at its outer end with weights 44 which serve to increase the momentum of the core as the solenoid 46 is energized. This weight 44 is urged outwardly by coil spring 48 to engage stop pin 50. Operating rod 36 when in the extended position shown in Fig. 1 just passes through the end wall of box 10 and is provided with a helical coil spring 52 which serves to urge operating rod 36 to a retracted position as it is slightly compressed between box 10 and a pin 54 mounted in rod 36. This pin 54 may be positioned in any of a plurality of holes 56 through rod 36 to vary the tension of spring coil 52 mounted around rod 36, if needed.

Latching pin 34 carried by rod 36 is angular in shape and has a radial section 33 carrying the latching section 34 which is parallel with rod 36 and passes through the long leg 57 of U-shaped plate 58 and over the short leg 55 of said plate 58 to engage stop post 59 anchored to the bottom of box 10 and serves to limit the forward movement of rod 36 to release lid 16. The U-shaped plate 58 is fixed to the bottom of box 10.

When open as shown in Fig. 1 the license tag is turned inward toward the back end of the automobile and therefore is not visible from the rear of the automobile. Therefore the operator of this signaling device is requested to print in the name of the state and the present license number of the automobile for proper identification.

As shown in Fig. 6 this switch 40 is shown in section to determine the general structure of said switch when the lid 16 is in the closed position to secure said switch in the opened position and in dotted lines to show the switch closed when the lid 16 is raised to the open position. The body 94 and operating button 96 of this switch are made of an electric insulating material and the hinged arm 97 is an electrical conductor which is urged by spring 95 to the closed position to close circuit to lamps 42 and 70, from battery 74 through conductors 80, 98, 97, and 99 and 100. To indicate to the automobile driver as to the operation of the signaling system a light bulb 70 is positioned in a concealed position visible only to the driver which will be lighted whenever the signaling device is being operated. This light bulb 70 is in multiple with the other light bulb 42 of this circuit whereby any breaking of this circuit to light bulb 42 will not affect the current to bulb 70 which will indicate that the signaling device is still operating to disclose the signaling means to anyone positioned at the rear of the automobile.

The electric circuit shown in Fig. 8 properly discloses the circuit used in this signaling device. The electrical supply means is shown as a battery 74 connected by a wire 76 to a suitable ground 78. A solenoid coil 46 is in circuit with battery 74 through wire 80 and is grounded at 82 through wire 84. This circuit from battery 74 is controlled by a foot switch 86 which is conveniently located to the driver which may be closed by the person in trouble to energize solenoid coil 46 whereby solenoid core 38 will be operated to release the latch 34 to release the lid 16 whereby it may be moved to the open position. As lid 16 moves away from switch 40, it will close a circuit from battery 74 to the light bulbs 42 and 70 which are wired in multiple and are respectively ground at 86 and 88 by wires 90 and 92. All circuit elements are grounded to the automobile frame which is insulated from the earth by rubber tires W.

What we claim as new and desire to protect by Letters Patent is:

1. A distress signalling device comprising a box adapted to be secured to an automobile, a lid for said box, said lid being disposed in a vertical plane when closed and being hinged to said box along its upper edge, latch means securing said lid in its closed position, manually actuated means operable to release said latch, resilient means operable when said latch is released to swing said lid to a position extending upwardly from the hinge thereof whereby to display a distress signal carried within said box and on the inner surface of said lid, and resilient means carried by said box and operable to arrest the opening movement of said lid, whereby said lid when open is held yieldably between said two resilient means, and whereby the vibration occasioned by normal operation of said automobile will cause said lid to oscillate on its hinge to display more effectively the distress signal carried thereby.

2. A distress signalling device as recited in claim 1 wherein the said two resilient means each constitute a spring carried by said box, the action of said two springs on said lid being equal and opposite when said lid is in an upright open position, the tension of said springs being only slightly greater than necessary to hold said lid upright against the force of gravity, whereby said lid will oscillate easily.

3. A distress signalling device as recited in claim 1 wherein the said two resilient means each constitutes a spring, and with the addition of means operable to adjust the tension of at least one of said springs, whereby the normal or average open position of said lid may be adjusted.

4. A distress signalling device as recited in claim 1 with the addition of an electrical circuit including an electric lamp positioned in said box, and an electrical switch operable by movement of said lid from its closed position to complete said circuit and light said lamp, said lamp being so disposed in said box that light therefrom contacts the inner surface of said lid during only a portion of each oscillation of said lid.

References Cited in the file of this patent
UNITED STATES PATENTS

| | | |
|---|---|---|
| 1,249,198 | McNally | Dec. 11, 1917 |
| 2,041,325 | De Lannoy | May 19, 1936 |

FOREIGN PATENTS

| | | |
|---|---|---|
| 124,036 | Switzerland | Jan. 2, 1928 |

OTHER REFERENCES

Popular Mechanics, November 1933, page 713,